US011241829B2

United States Patent
Brahmstedt

(10) Patent No.: US 11,241,829 B2
(45) Date of Patent: Feb. 8, 2022

(54) ORIENTABLE NOZZLE FOR ADDITIVE MANUFACTURING

(71) Applicant: Andrew Micah Brahmstedt, Rockford, IL (US)

(72) Inventor: Andrew Micah Brahmstedt, Rockford, IL (US)

(73) Assignee: Ingersoll Machine Tools, Inc., Rockford, IL (US)

( * ) Notice: Subject to any disclaimer, the term of this patent is extended or adjusted under 35 U.S.C. 154(b) by 0 days.

(21) Appl. No.: 17/066,736

(22) Filed: Oct. 9, 2020

(65) Prior Publication Data

US 2021/0107218 A1 Apr. 15, 2021

Related U.S. Application Data

(60) Provisional application No. 62/914,068, filed on Oct. 11, 2019.

(51) Int. Cl.
| | |
|---|---|
| *B29C 64/209* | (2017.01) |
| *B29C 64/241* | (2017.01) |
| *B29C 64/25* | (2017.01) |
| *B29C 64/295* | (2017.01) |
| *B33Y 30/00* | (2015.01) |

(52) U.S. Cl.
CPC .......... *B29C 64/209* (2017.08); *B29C 64/241* (2017.08); *B29C 64/25* (2017.08); *B29C 64/295* (2017.08); *B33Y 30/00* (2014.12)

(58) Field of Classification Search
CPC ... B29C 64/106; B29C 64/209; B29C 64/241; B29C 64/25; B29C 64/295; B33Y 30/00
See application file for complete search history.

(56) References Cited

U.S. PATENT DOCUMENTS

| | | | | | |
|---|---|---|---|---|---|
| 1,836,336 | A | * | 12/1931 | Replogle | F16L 27/0849 285/181 |
| 1,985,544 | A | * | 12/1934 | Muchnic | C10G 9/20 285/135.5 |
| 3,114,392 | A | * | 12/1963 | Harper | B61C 17/02 137/615 |

(Continued)

FOREIGN PATENT DOCUMENTS

| | | |
|---|---|---|
| CN | 104 742 375 A | 7/2015 |
| WO | WO 97/19798 A2 | 6/1997 |
| WO | WO 2017/122942 A1 | 7/2017 |

*Primary Examiner* — Joseph S Del Sole
*Assistant Examiner* — Manley L Cummins, IV
(74) *Attorney, Agent, or Firm* — Reinhart Boerner Van Deuren P.C.

(57) ABSTRACT

Apparatuses, applicable to new or existing large envelope, 3-axes Cartesian machinery for additive manufacturing, based on Fused Deposition of thermoplastic material deposited in subsequent layers one on top of another, wherein the output nozzle dispensing the molten printing material can be oriented in space by adding 2 independent polar axes interposed between the extruder screw output and the dispensing nozzle are described. The adjustment of these polar axes may be manually set and locked in a desired position or motorized and controlled by machine CNC thus allowing a full 5-axes material deposition. Such is particularly useful in critical zones of large envelope parts where the polar orientability of the nozzle allows improved lay-up strategy results in better dimensional and structural lay-up quality.

20 Claims, 5 Drawing Sheets

(56) References Cited

U.S. PATENT DOCUMENTS

| | | | | |
|---|---|---|---|---|
| 3,720,479 | A | * | 3/1973 | Latinen .................. B29C 48/76 |
| | | | | 416/198 R |
| 5,266,021 | A | * | 11/1993 | Jacobson .............. B29C 48/131 |
| | | | | 425/334 |
| 5,633,021 | A | * | 5/1997 | Brown .................... B29C 64/40 |
| | | | | 425/375 |
| 2004/0164436 | A1 | | 8/2004 | Khoshnevis |
| 2006/0012174 | A1 | * | 1/2006 | Garton .................... F16L 27/10 |
| | | | | 285/412 |
| 2015/0183149 | A1 | * | 7/2015 | Chow ..................... B29C 31/04 |
| | | | | 425/200 |
| 2015/0367375 | A1 | * | 12/2015 | Page ....................... B29C 64/10 |
| | | | | 118/697 |
| 2017/0197346 | A1 | * | 7/2017 | Song ....................... B29C 48/02 |
| 2017/0320267 | A1 | | 11/2017 | Lind et al. |
| 2017/0326793 | A1 | * | 11/2017 | Susnjara ............... B29C 64/112 |
| 2019/0022936 | A1 | * | 1/2019 | Mansson .............. B25J 15/0019 |
| 2019/0047219 | A1 | * | 2/2019 | Chesser ................ B29C 64/209 |
| 2019/0091929 | A1 | * | 3/2019 | Harrison ................ B33Y 50/02 |

\* cited by examiner

ORIENTABLE NOZZLE FOR ADDITIVE MANUFACTURING

CROSS-REFERENCE TO RELATED PATENT APPLICATIONS

This patent application claims the benefit of U.S. Provisional Patent Application No. 62/914,068, filed Oct. 11, 2019, the entire teachings and disclosure of which are incorporated herein by reference thereto.

FIELD OF THE INVENTION

This invention generally relates to Automatic Additive Manufacturing systems, and more particularly to nozzles for automatic fused deposition for use therein.

BACKGROUND OF THE INVENTION

The additive manufacturing technology (three-dimensional (3D) printing) is rapidly expanding, attracting interests for the development of new improved materials as well as higher performing automated machines used for the automatic fused deposition of materials to form any desired tridimensional shape. Indeed, there is also a growing interest to expand the size of the formed parts.

The most commonly used materials are in the thermoplastic family. The automatic systems typically used include an extruder head, carried out spatially by multi-axis positioners featuring a given work-envelope, and a fully integrated automatic material feed system.

Additive manufacturing equipment typically uses a layer-based process to build any desired tridimensional part. The machinery takes data directly from Computer Aided Design (CAD) files and creates functional parts by extruding and depositing, layer after layer, fused material from its extruder nozzle, making it possible easily to build even very complex parts.

In particular, each new layer is deposited on top of the previous one and has a cross section size and shape that depends on several key parameters, such as material type, material temperature, extruder output flow, machine feeding rate, and several others. The multiple layer building process is aimed at producing parts which have to be ultimately stable in shape and meet a desired strength and durability.

The most common machine configuration for large envelope systems is a Cartesian 3-axes machine featuring a gantry-type structure with a vertical ram to which an extruder end effector is connected.

The extruder assembly is typically a motorized screw extruder featuring means to feed the material, suitable heating means and an output nozzle, typically coaxial to the screw (linear arrangement). The entire assembly is typically bolted parallel or coaxial to the machine vertical ram, hence the extruder nozzle center line being vertical with the material flowing downwardly.

Combining the full CNC control of the nozzle motion with all the extruder operating parameters, present equipment allows the lay-up of rather complex shapes and impressive part sizes, even with an output nozzle remaining strictly vertical.

However, these systems have still some limitations, especially in critical zones where the lay-up faces the challenge of walls having the tendency to collapse under their own weight while not yet fully cured.

In view of the above, embodiments of the present invention provide an apparatus and method, herein described in a plurality of alternative embodiments, to overcome or reduce the problems existing in the art. These and other advantages of the embodiments of the present invention, as well as additional inventive features, will be apparent from the description of the embodiments of the invention provided herein.

BRIEF SUMMARY OF THE INVENTION

It has been discovered that, for said problematic zones as discussed above and otherwise known to those skilled in the art, tangible improvements can be achieved by locally adopting a lay-up strategy requiring a dedicated nozzle orientation.

It has also been discovered that the ability to change the output nozzle orientation is an effective additional means to better selectively control the desired bead shape during the lay-up process.

Therefore, in order to overcome or minimize the above described problems and others, there is a need in the field of gantry-type large envelope equipment for an orientable nozzle. Such an orientable nozzle allows part-programs to be built wherein an operator can assign the optimal orientation of the nozzle center-line as an option to a vertical default position.

Embodiments of the present invention provide such methods and apparatuses to orient the output nozzle of the extruder versus the machine ram vertical center-line Z axis (or extruder center line).

Preferably, at least one of the embodiments of the present invention is fully programmable, and still more preferably such programmability forms an integral part of the CNC controlled lay-up process.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
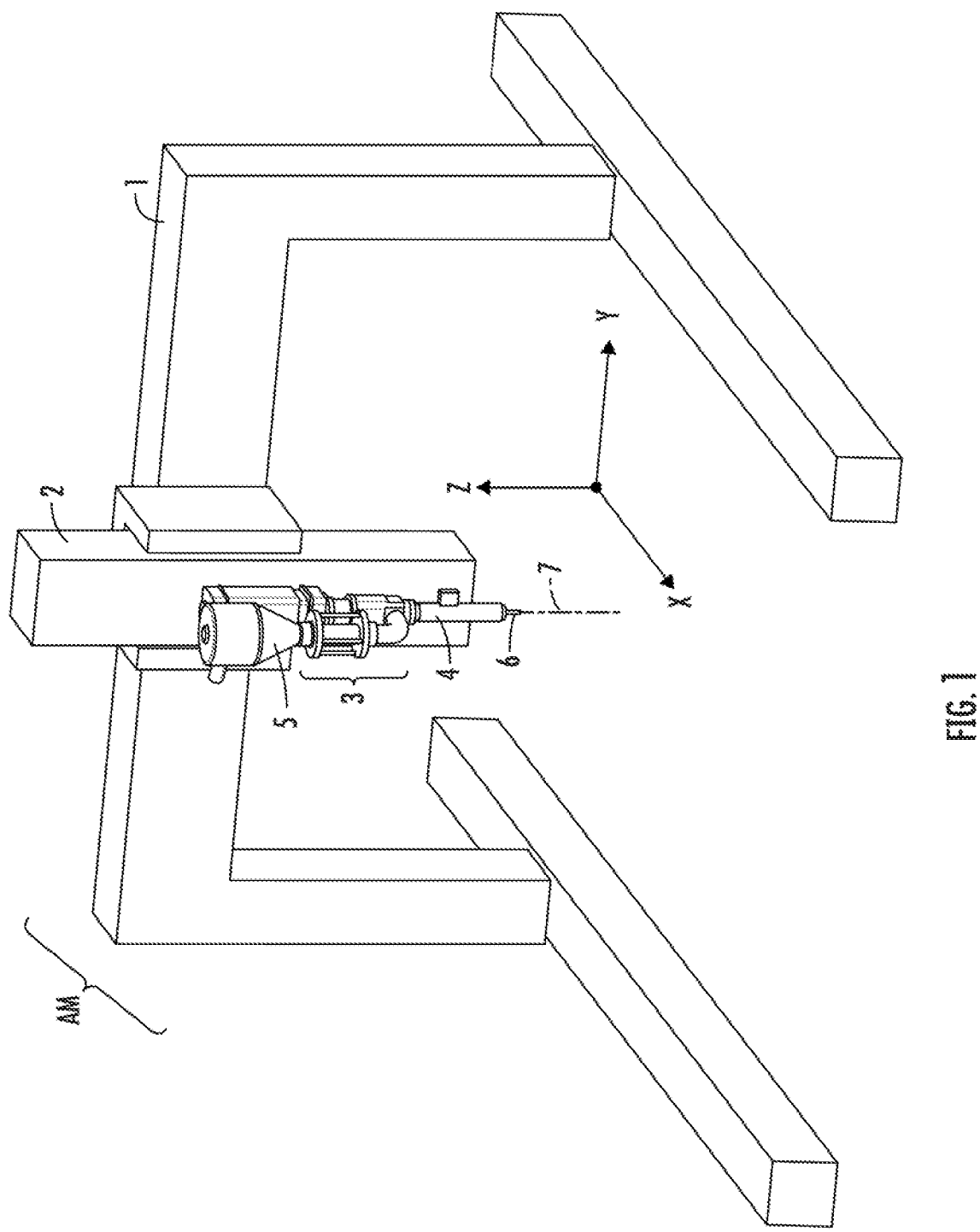
FIG. 1 is a prospective view of a large envelope additive manufacturing machine to which embodiments of the present invention are particularly applicable, although not limited thereto.

Turning now to the figures, there is illustrated in FIG. 1 a schematic illustration of a typical large envelope additive manufacturing (AM) system featuring a Cartesian gantry-type machine with a horizontal cross rail (gantry) 1 and a vertical ram 2 that is particularly well suited to embodiments of the present invention. The AM machine, in its basic configuration, moves along X, Y and Z linear axes and the extruder 3 is mounted to the machine ram 2. It should be noted, however, that while the following will describe embodiments of the present invention with regard to this exemplary operating environment, there is no intention to limit the scope of the invention to such. Indeed, the description of the examples that follow should be taken by way of example and not by way of limitation.

In the illustrated embodiment, the extruder 3 utilizes a motorized screw 4 connected to an automatic material feeding system 5, and the output nozzle 6 is coaxial to the extruder screw 4 presenting a center line 7 parallel to the vertical Z axis.

Figure 2:
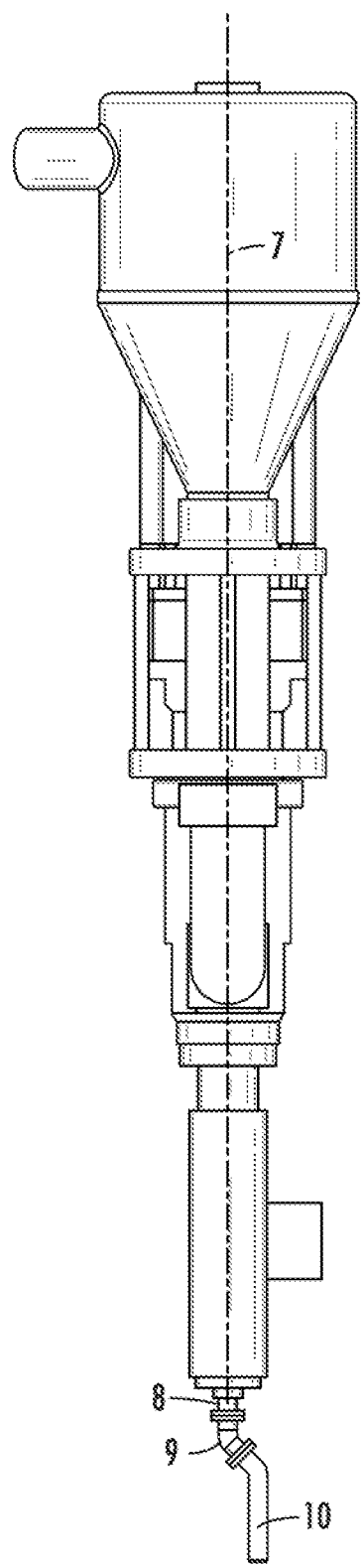
FIG. 2 is an isometric view of one embodiment of an apparatus constructed according to the teachings of the present invention.
Figure 3:
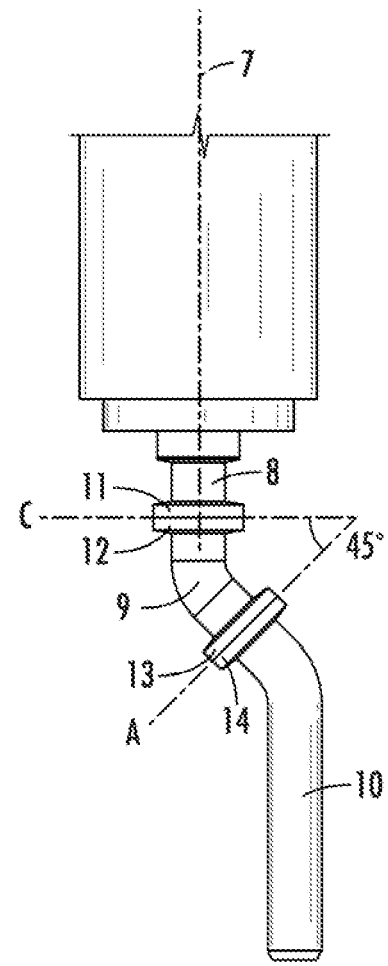
FIG. 3 is an enlarged isometric view of a nozzle portion of the apparatus of FIG. 2.

FIG. 2 shows an embodiment of the orientable nozzle assembly according to the present invention, and FIG. 3 is an enlarged detail illustration of the nozzle portion thereof. The nozzle assembly includes an extruder adapter 8, an intermediate elbow 9, and a print output nozzle 10. Adapter 8 is connected to the extruder and receives the molten (melted) print material. Elbow 9 is connected to adapter 8 by the rotary adjustable flanges 11 and 12, which may be rotated one versus the other of an angle C between zero and 360 degrees. Likewise, nozzle 10 is connected to elbow 9 by rotary adjustable flanges 13 and 14, offering the possibility to rotate around an angle A between 0 and 360 degrees. It should be noted that the suitable heating means and insulating jackets mentioned above are not shown in order better to illustrate the flange 11, 12, 13, and 14 connections and the angular bends for the adapter 8, elbow 9, and nozzle 10 of the illustrated embodiment of the present invention. However, inclusion of such suitable heating means and insulating jackets for these components may be included as required depending on the type of print material used to prevent a reduction in temperature thereof that may result in an increase in viscosity of the molten print material flowing therethrough as is known in the art.

Flanges 11 and 12 are horizontal and perpendicular to the extruder vertical center-line 7. The elbow 9 features a 45 degree curvature between its inlet and outlet internal conduits. In the present embodiment utilizing elbow 9, therefore, flanges 11 and 12 present a 45 degree orientation versus flanges 13 and 14. In the illustrated embodiment, output nozzle 10 also includes a 45 degrees curvature between its inlet and outlet internal conduits.

The coupling of flanges 11 and 12, as well as 13 and 14, include a bearing to allow relative rotation between the two flanges and a rotating seal suitable to withstand material pressure and temperature. These components are readily commercially available and are not illustrated.

As a result of above described component arrangement, by changing the relative angle C between flange 11 and 12, as well as or alternatively, the angle A between flange 13 and 14, the output conduit center-line of output nozzle 10 can assume any desired angle versus the machine vertical Z axis in both X-Z and Y-Z planes. In other words, A and C rotation introduce two additional polar degrees of freedom to the nozzle 10 output, hence allowing the nozzle 10 to dispense the molten material in a direction pointing to any desired point belonging to a spherical surface centered at the end of the machine ram.

Figure 4:
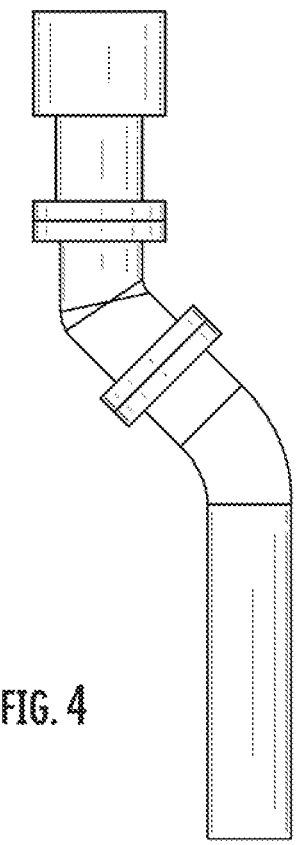
FIGS. 4-6 are isometric illustrations showing various nozzle orientations for the nozzle of the apparatus of FIG. 2.
Figure 5:
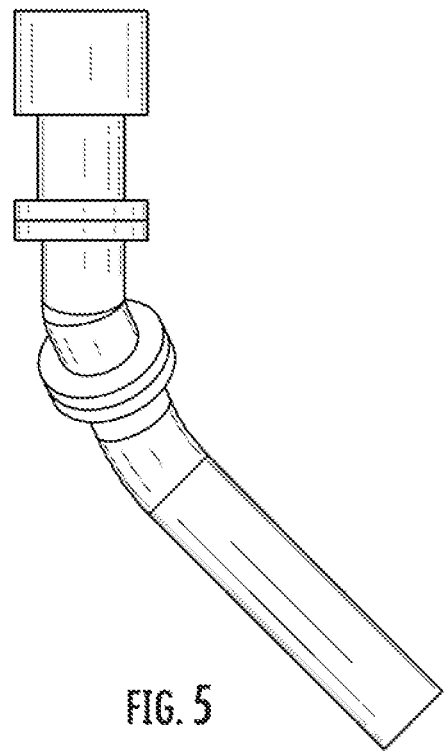
Figure 6:
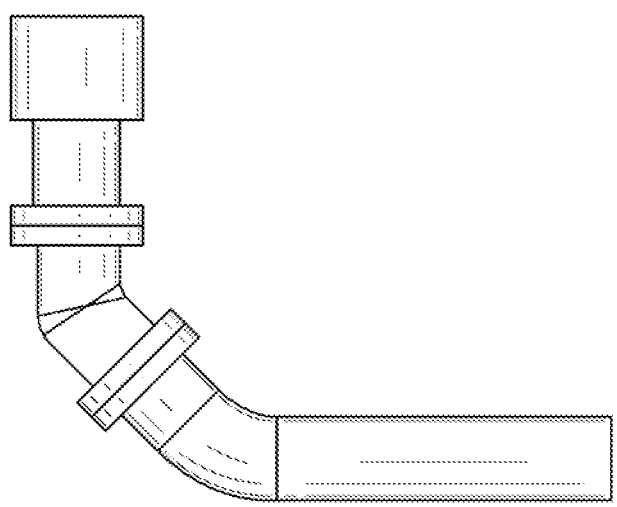

FIGS. 4-6 illustrate three of such orientations, to wit, 0 degrees from vertical (FIG. 4), 45 degrees from vertical (FIG. 5), and 90 degrees from vertical (FIG. 6).

As better clarified hereinafter, the adjustment of A and/or C angle can be manual, or motorized and fully CNC controlled. In one embodiment, the A axis adjustability range is limited to 0-180 degrees.

The arrangement illustrated in FIGS. 2 and 3 provides simplicity and easy access and compactness of the driving mechanism (not illustrated) in conjunction to an easier possibility to house the necessary bearing and seals between the connecting flanges 11 and/or 12, or 13 and 14.

Figure 7:
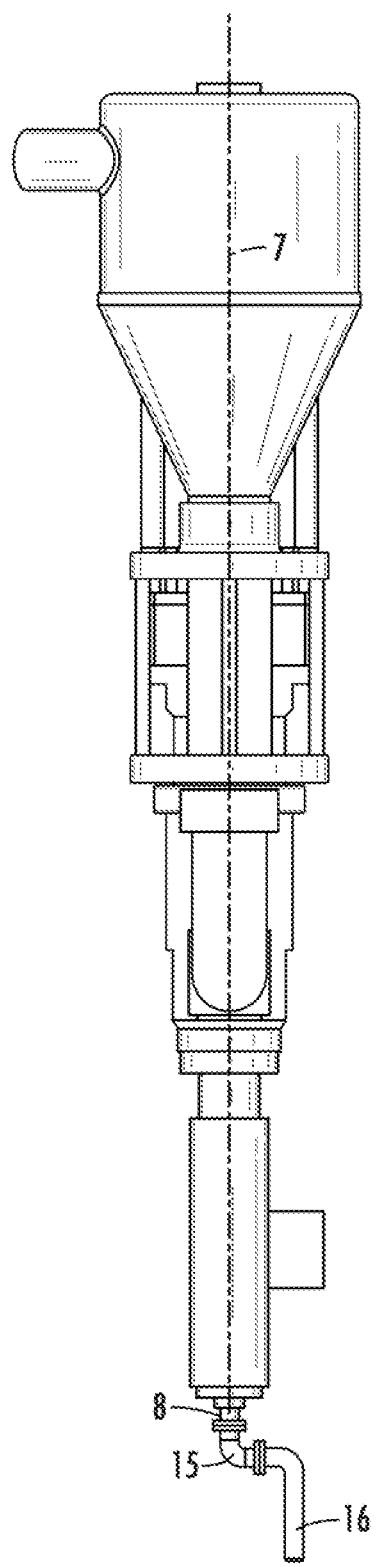
FIG. 7 is an isometric view of another embodiment of an apparatus constructed according to the teachings of the present invention.
Figure 8:
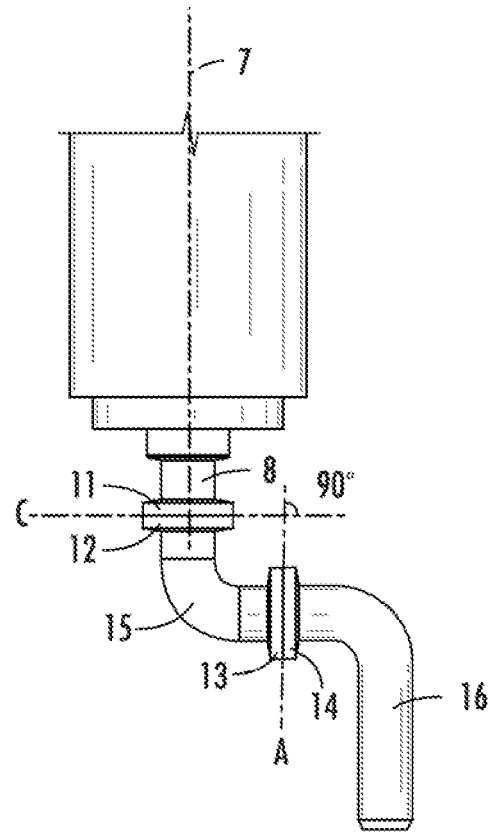
FIG. 8 is an enlarged isometric view of a nozzle portion of the apparatus of FIG. 7.

FIGS. 7 and 8 illustrate an alternative embodiment of the present invention wherein the angle between the flanges 11, 12 and 13, 14 is increased to 90 degrees versus the 45 degrees of FIGS. 2 and 3. In this embodiment the elbow 15 as well as the nozzle 16 have a 90 degree curvature between its inlet and outlet internal conduits.

Figure 9:
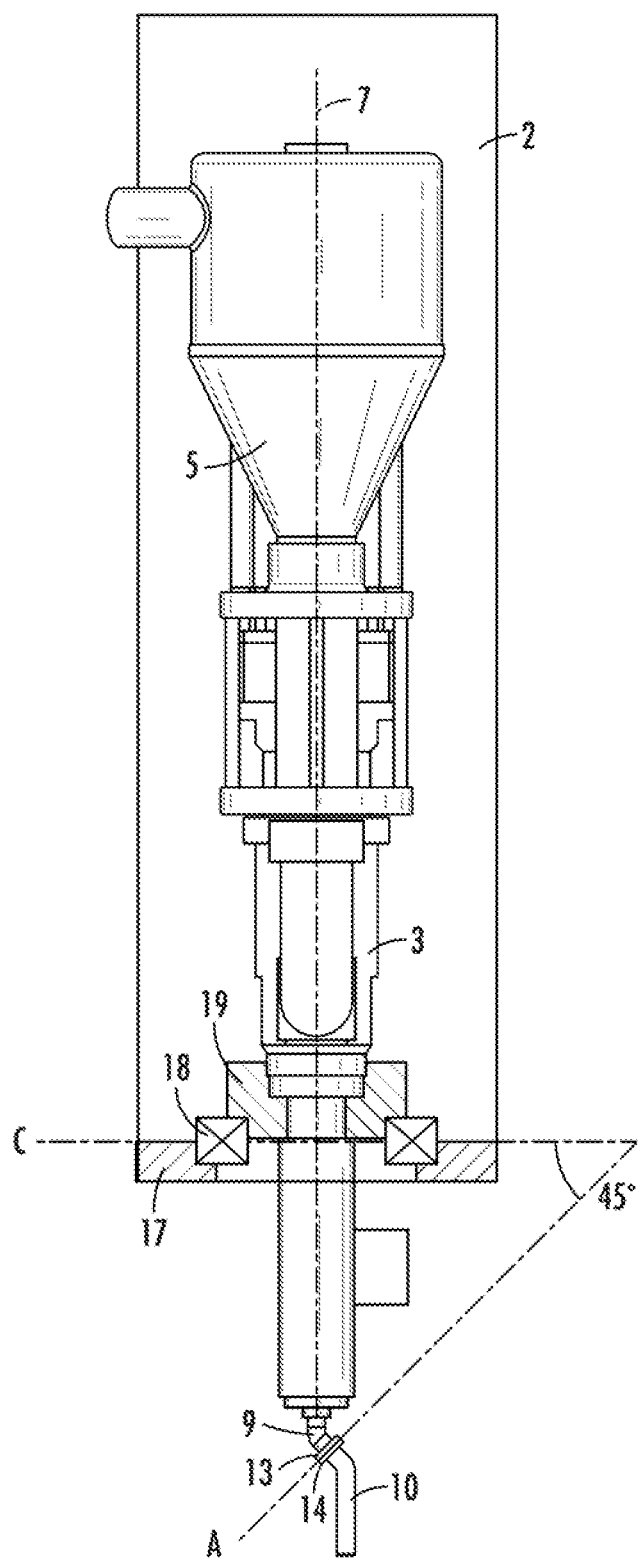
FIG. 9 is an isometric view of a still further embodiment of an apparatus constructed according to the teachings of the present invention.

FIG. 9 illustrates another alternative embodiment of the present invention wherein the elbow 9 is coupled to the output of the extruder and is coupled to the nozzle 10 via flanges 13, 14 to provide the single rotation angle A. Additionally, in a further embodiment, the C angle rotation is achieved by rotating the entire extruder assembly and nozzle around the extruder center line 7 by means of a bearing 18 interposed between machine ram 2 and extruder body 3 by means of supports 17 and 19.

In all above described embodiments, the adjustment of the angles C and/or A can be manually adjusted and locked in any desired position or can be motorized and CNC controlled.

From what is above described, it is evident how the orientable nozzle system according to the present invention reaches the scope and provides the desired additional degree of freedom to improve the overall system performances.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

I claim:

1. An orientable nozzle assembly for an additive manufacturing system, comprising:
    an elbow in fluid communication with an output of an extruder of the additive manufacturing system, the elbow having a first angle of bend;
    a nozzle operably coupled by a first flange and a second flange to the elbow, the nozzle having a second angle of bend; and
    wherein the first flange and the second flange are rotatable relative to one another.

2. The orientable nozzle assembly of claim 1, wherein the first angle and the second angle are the same.

3. The orientable nozzle assembly of claim 2, wherein the first angle and the second angle are 45 degrees.

4. The orientable nozzle assembly of claim 2, wherein the first angle and the second angle are 90 degrees.

5. The orientable nozzle assembly of claim 1, further comprising:
    a third flange and a fourth flange rotatable relative to one another; and
    wherein the third flange and the fourth flange are positioned to rotate the elbow.

6. The orientable nozzle assembly of claim 5, wherein the third flange and the fourth flange are interposed between the elbow and the output of the extruder of the additive manufacturing system.

7. The orientable nozzle assembly of claim 6, further comprising an extruder adaptor fluidly coupling the output of the extruder, through the third flange and the fourth flange, to the elbow.

8. The orientable nozzle assembly of claim 5, wherein the third flange and the fourth flange are interposed between the extruder and a ram of the additive manufacturing system.

9. The orientable nozzle assembly of claim 5, wherein the third flange and the fourth flange are manually rotatable relative to one another.

10. The orientable nozzle assembly of claim 5, wherein rotation of the third flange and the fourth flange relative to one another is motorized.

11. The orientable nozzle assembly of claim 1, wherein the first flange and the second flange are manually rotatable relative to one another.

12. The orientable nozzle assembly of claim 1, wherein rotation of the first flange and the second flange relative to one another is motorized.

13. The orientable nozzle assembly of claim 1, further comprising a heater positioned in thermal communication to at least one of the elbow and the nozzle.

14. The orientable nozzle assembly of claim 13, wherein the heater is positioned in thermal communication to both of the elbow and the nozzle.

15. The orientable nozzle assembly of claim 13, further comprising an insulating jacket surrounding the heater.

16. An additive manufacturing (AM) system, comprising:
    a Cartesian gantry-type machine having a horizontal cross rail and a vertical ram;
    an extruder mounted to the vertical ram, the extruder having a motorized screw connected to an automatic material feeding system;
    an orientable nozzle assembly; and
    wherein the orientable nozzle assembly includes an elbow in fluid communication with an output of the extruder, the elbow having a first angle of bend, a nozzle operably coupled by a first flange and a second flange to the elbow, the nozzle having a second angle of bend, and wherein the first flange and the second flange are rotatable relative to one another.

17. The AM system of claim 16, further comprising:
    a third flange and a fourth flange rotatable relative to one another and interposed between the elbow and the output of the extruder; and
    wherein the third flange and the fourth flange are positioned to rotate the elbow.

18. The AM system of claim 17, further comprising an extruder adaptor fluidly coupling the output of the extruder, through the third flange and the fourth flange, to the elbow.

19. The AM system of claim 16, wherein the first flange and the second flange are one of manually rotatable relative to one another or wherein rotation of the first flange and the second flange relative to one another is motorized.

20. The AM system of claim 16, further comprising a heater positioned in thermal communication to at least one of the elbow and the nozzle.

* * * * *